United States Patent
Willey

(10) Patent No.: US 8,843,564 B2
(45) Date of Patent: Sep. 23, 2014

(54) SYSTEM AND METHOD OF AUTOMATICALLY DETERMINING WHETHER OR NOT TO INCLUDE MESSAGE TEXT OF AN ORIGINAL ELECTRONIC MESSAGE IN A REPLY ELECTRONIC MESSAGE

(75) Inventor: William Daniel Willey, San Francisco, CA (US)

(73) Assignee: BlackBerry Limited, Waterloo (CA)

( * ) Notice: Subject to any disclaimer, the term of this patent is extended or adjusted under 35 U.S.C. 154(b) by 1573 days.

(21) Appl. No.: 11/128,705

(22) Filed: May 13, 2005

(65) Prior Publication Data

US 2006/0259554 A1 Nov. 16, 2006

(51) Int. Cl.
*G06F 15/16* (2006.01)

(52) U.S. Cl.
USPC .......................................................... 709/206

(58) Field of Classification Search
USPC .................................... 709/204–207
See application file for complete search history.

(56) References Cited

U.S. PATENT DOCUMENTS

| | | | |
|---|---|---|---|
| 5,325,310 A | 6/1994 | Johnson et al. | |
| 5,958,006 A * | 9/1999 | Eggleston et al. | 709/219 |
| 6,073,165 A * | 6/2000 | Narasimhan et al. | 709/206 |
| 6,169,911 B1 | 1/2001 | Wagner et al. | |
| 6,247,045 B1 * | 6/2001 | Shaw et al. | 709/207 |
| 6,393,465 B2 * | 5/2002 | Leeds | 709/207 |
| 6,701,440 B1 * | 3/2004 | Kim et al. | 726/24 |
| 6,725,256 B1 * | 4/2004 | Albal et al. | 709/206 |
| 6,816,885 B1 * | 11/2004 | Raghunandan | 709/206 |
| 6,917,965 B2 * | 7/2005 | Gupta et al. | 709/206 |
| 6,957,259 B1 * | 10/2005 | Malik | 709/225 |
| 7,299,361 B1 * | 11/2007 | Kim et al. | 713/188 |
| 7,653,189 B1 * | 1/2010 | Fournier et al. | 379/201.01 |

(Continued)

FOREIGN PATENT DOCUMENTS

| EP | 0 322 105 | 6/1989 |
|---|---|---|
| EP | 0322105 | 6/1989 |

OTHER PUBLICATIONS

Institute of Education—University of London: "Introduction to outlook 2000 (PCc)" Institute of Education—University of London, Nov. 2000, XP002345158.

(Continued)

*Primary Examiner* — Rupal Dharia
*Assistant Examiner* — Marcus McKenzie
(74) *Attorney, Agent, or Firm* — Novak Druce Connolly Bove + Quigg LLP

(57) ABSTRACT

A system and method for automatically determining whether or not original message text should be included in a reply electronic message is provided. In one broad aspect, the original message text is included in the reply electronic message as a function of the original message. In a first example, the original message text is included as a function of a domain name of an originating address. In a second example, the original message text is included as a function of maintained information used for determining if original message text should be included in reply electronic messages. In a third example, the original message text is included as a function of an indicative encoding inside the original electronic message. In a fourth example, the original message text is included as a function of maintained information used for detecting address aliases. In another broad aspect, the original electronic message is encoded with an indicative encoding as to whether or not a reply electronic message should include the original message text.

20 Claims, 14 Drawing Sheets

(56) References Cited

U.S. PATENT DOCUMENTS

| | | | |
|---|---|---|---|
| 2001/0034849 A1* | 10/2001 | Powers | 713/202 |
| 2001/0042098 A1* | 11/2001 | Gupta et al. | 709/206 |
| 2001/0054073 A1* | 12/2001 | Ruppert et al. | 709/206 |
| 2002/0004821 A1* | 1/2002 | Togawa et al. | 709/206 |
| 2002/0016824 A1* | 2/2002 | Leeds | 709/207 |
| 2002/0073159 A1* | 6/2002 | Jain | 709/206 |
| 2003/0081555 A1* | 5/2003 | Laumen et al. | 370/238 |
| 2003/0158903 A1* | 8/2003 | Rohall et al. | 709/206 |
| 2004/0015554 A1 | 1/2004 | Wilson | |
| 2004/0039843 A1* | 2/2004 | Fuisz | 709/245 |
| 2004/0068544 A1* | 4/2004 | Malik et al. | 709/206 |
| 2004/0088737 A1* | 5/2004 | Donlan et al. | 725/135 |
| 2004/0153523 A1* | 8/2004 | Albal et al. | 709/206 |
| 2004/0199592 A1* | 10/2004 | Gould et al. | 709/206 |
| 2004/0266389 A1* | 12/2004 | Kennedy | 455/404.1 |
| 2005/0228996 A1* | 10/2005 | Mayer | 713/170 |
| 2006/0005017 A1* | 1/2006 | Black et al. | 713/165 |
| 2006/0010220 A1* | 1/2006 | Malik | 709/206 |
| 2006/0026248 A1* | 2/2006 | Bauchot et al. | 709/206 |
| 2006/0026655 A1* | 2/2006 | Perez | 725/91 |
| 2006/0031328 A1* | 2/2006 | Malik | 709/206 |
| 2006/0041505 A1* | 2/2006 | Enyart | 705/40 |
| 2006/0075228 A1* | 4/2006 | Black et al. | 713/167 |
| 2006/0179114 A1* | 8/2006 | Deeds | 709/206 |
| 2006/0259554 A1* | 11/2006 | Willey | 709/206 |
| 2007/0157252 A1* | 7/2007 | Perez | 725/61 |
| 2007/0224969 A1* | 9/2007 | Rao | 455/411 |
| 2008/0256208 A1* | 10/2008 | Keohane et al. | 709/206 |
| 2008/0299998 A1* | 12/2008 | Choi | 455/466 |
| 2009/0034729 A1* | 2/2009 | Brown et al. | 380/270 |
| 2010/0088386 A1* | 4/2010 | Daniell et al. | 709/206 |

OTHER PUBLICATIONS

Earthlink Web Mail Help—Reading and Sorting Email http://www.earthlink.net/webmail/help/earthlink/en_US/readnsort.html Printed on: Aug. 11, 2005.

Nova Southeastern Univeriity, Technology Training Services—How to use Netscape Communicator Messenger (email) http://www.nova.edu/techtrain/email/netscapemail.html Printed on: Aug. 11, 2005.

Office Action that issued on Aug. 31, 2010 from corresponding Canadian Patent Application No. 2,546,770.

\* cited by examiner

SYSTEM AND METHOD OF AUTOMATICALLY DETERMINING WHETHER OR NOT TO INCLUDE MESSAGE TEXT OF AN ORIGINAL ELECTRONIC MESSAGE IN A REPLY ELECTRONIC MESSAGE

COPYRIGHT NOTICE

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

FIELD OF THE APPLICATION

The application relates to electronic communication and more particularly to electronic messages.

BACKGROUND

An electronic message is sent from an originator to at least one recipient according to an electronic message address associated with the recipient. Once the recipient receives an electronic message, the recipient can reply to the electronic message by sending a reply electronic message back to the originator. The reply electronic message can include message text of the original electronic message (i.e. the electronic message being replied to). An email message is an example of an electronic message.

BRIEF DESCRIPTION OF THE DRAWINGS

Preferred embodiments will now be described with reference to the attached drawings in which.

DETAILED DESCRIPTION OF THE PREFERRED EMBODIMENTS

Figure 1:
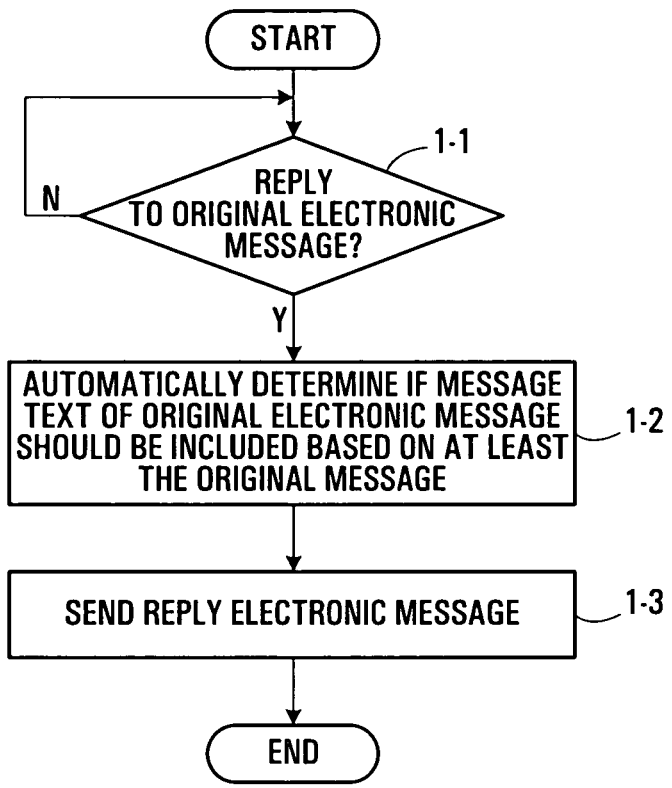
FIGS. 1 through 8 are flowcharts of example methods of automatically determining if message text of an original electronic message should be included in a reply electronic message.

According to a broad aspect, there is provided a method comprising: receiving an original electronic message, the original electronic message comprising original message text; automatically determining if a reply electronic message is to contain at least the original message text based on at least the original electronic message; and sending the reply electronic message.

In some embodiments, the original electronic message further comprises an originating address, the originating address comprising a domain name; and automatically determining if the reply electronic message is to contain at least the original message text is based on at least the domain name.

In some embodiments, the method further comprises: performing a domain name check to determine if users of the domain name are charged according to electronic message size; and automatically determining not to contain the original message text in the reply electronic message if users of the domain name are charged according to electronic message size.

In some embodiments, the domain name check comprises a comparison of the domain name with an identification of domains of service providers that charge users according to message size.

In some embodiments, the originating address is a "reply-to" address, the reply electronic message being sent to the "reply-to" address.

In some embodiments, the method further comprises: maintaining information useful for automatically determining if the reply electronic message is to contain at least the original message text; wherein automatically determining if the reply electronic message is to contain at least the original message text is based on at least the maintained information.

In some embodiments, the maintained information comprises an identification of message addresses to which original message text should not be included in reply electronic messages.

In some embodiments, maintaining information comprises: in response to user input, adding an identification of a message address to which original message text should not be included in reply electronic messages; and in response to user input, editing an existing identification of message address to which original message text should not be included in reply electronic messages.

In some embodiments, the original electronic message further comprises a "reply-to" address and a "from" address; and if any one of the "reply-to" address and the "from" address is identified as being a message addresses to which original message text should not be included in reply electronic messages, then the original message text is not included in the reply electronic message.

In some embodiments, the original electronic message comprises an indicative encoding; and automatically determining if the reply electronic message is to contain at least the original message text is based on at least the indicative encoding.

In some embodiments, the method further comprises: maintaining information used for detecting use of address aliases; wherein automatically determining if the reply electronic message is to contain at least the original message text is based on at least the maintained information.

In some embodiments, the maintained information comprises an identification of previously sent electronic messages; the original electronic message comprises an originating address; and detecting use of address aliases comprises: detecting that the original electronic message is in reply to a previously sent electronic message, the previously sent electronic message being sent to a sent address; and detecting that the originating address is not identical to the sent address.

In some embodiments, the originating address is a "from" address.

In some embodiments, the method further comprises: accepting user input; wherein automatically determining if the reply electronic message is to contain at least the original message text is based on at least the original electronic message and user input.

In some embodiments, the method further comprises: an override mechanism allowing a user to override the automatic determination of including at least the original message text in the reply electronic message.

In some embodiments, the method further comprises: maintaining information useful for automatically determining if the reply electronic message is to contain at least the original message text; and upon a user override, updating the maintained information according to the user override.

According to a broad aspect, there is provided an electronic message-enabled device adapted to implement a method comprising: receiving an original electronic message, the original electronic message comprising original message text; automatically determining if a reply electronic message is to contain at least the original message text based on at least the original electronic message; and sending the reply electronic message.

According to a broad aspect, there is provided a computer readable medium having computer executable instructions stored thereon for execution on an electronic message-enabled device so as to implement a method comprising: receiving an original electronic message, the original electronic message comprising original message text; automatically determining if a reply electronic message is to contain at least the original message text based on at least the original electronic message; and sending the reply electronic message.

According to a broad aspect, there is provided an email-enabled wireless device comprising a wireless access radio, the email-enabled wireless device being adapted to implement a method comprising: receiving an original electronic message, the original electronic message comprising original message text; automatically determining if a reply electronic message is to contain at least the original message text based on at least the original electronic message; and sending the reply electronic message.

According to a broad aspect, there is provided a computer readable medium having computer executable instructions stored thereon for execution on an email-enabled wireless device so as to implement a method comprising: receiving an original electronic message, the original electronic message comprising original message text; automatically determining if a reply electronic message is to contain at least the original message text based on at least the original electronic message; and sending the reply electronic message.

According to a broad aspect, there is provided a method in an electronic message infrastructure comprising: receiving an original electronic message, the original electronic message comprising original message text; encoding into the original electronic message an indicative encoding of whether or not a reply electronic message is to contain at least the original message text; and delivering the original electronic message.

In some embodiments, the method further comprises: performing a domain name check to determine if a recipient of the reply electronic message is charged according to electronic message size; wherein the indicative encoding is a function of results of the domain name check.

According to a broad aspect, there is provided an electronic message infrastructure adapted to implement a method comprising: receiving an original electronic message, the original electronic message comprising original message text; encoding into the original electronic message an indicative encoding of whether or not a reply electronic message is to contain at least the original message text; and delivering the original electronic message.

According to a broad aspect, there is provided an intermediate processing function adapted to implement a method comprising: receiving an original electronic message, the original electronic message comprising original message text; encoding into the original electronic message an indicative encoding of whether or not a reply electronic message is to contain at least the original message text; and delivering the original electronic message.

According to a broad aspect, there is provided a computer readable medium having computer executable instructions stored thereon for execution on an electronic message infrastructure so as to implement a method comprising: receiving an original electronic message, the original electronic message comprising original message text; encoding into the original electronic message an indicative encoding of whether or not a reply electronic message is to contain at least the original message text; and delivering the original electronic message.

According to a broad aspect, there is provided a method in an originating electronic message-enabled device comprising: encoding into an original electronic message an indicative encoding, the original electronic message comprising original message text, the indicative encoding indicating whether or not a reply electronic message is to contain at least the original message text.

In some embodiments, the method further comprises: accepting user input as to whether or not a reply electronic message is to contain at least the original message text; wherein the indicative encoding comprises the user input.

According to a broad aspect, there is provided an originating electronic message-enabled device adapted to implement a method comprising: encoding into an original electronic message an indicative encoding, the original electronic message comprising original message text, the indicative encoding indicating whether or not a reply electronic message is to contain at least the original message text.

According to a broad aspect, there is provided a computer readable medium having computer executable instructions stored thereon for execution on an originating electronic message-enabled device so as to implement a method comprising: encoding into an original electronic message an indicative encoding, the original electronic message comprising original message text, the indicative encoding indicating whether or not a reply electronic message is to contain at least the original message text.

Electronic Message-Enabled Devices

Figure 9:
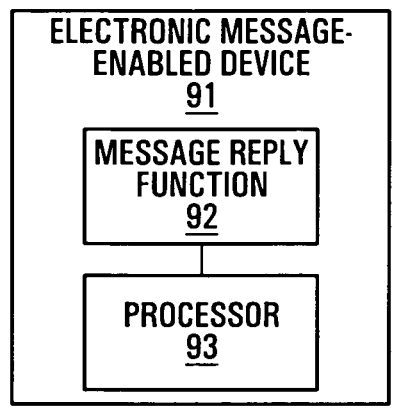
FIGS. 9 and 10 are schematics of example electronic message-enabled devices adapted to automatically determine if message text of an original electronic message should be included in a reply electronic message.
Figure 10:
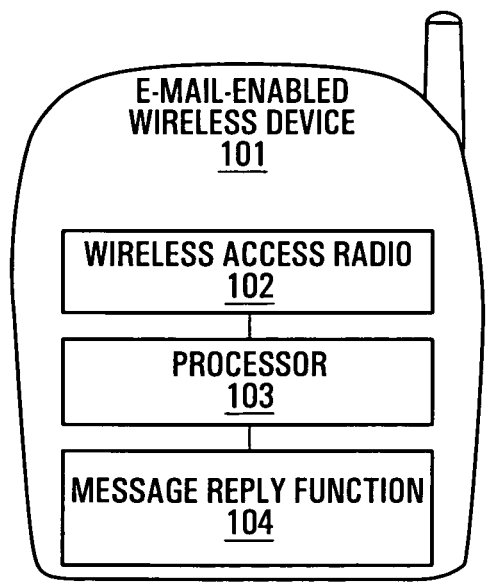

Referring now to FIGS. 9 and 10, shown are schematics of example electronic message-enabled devices adapted to automatically determine if message text of an original electronic message should be included in a reply electronic message. The terms "original electronic message" and "reply electronic message" are used to distinguish between a message and a reply to the same message.

FIG. 9 shows a schematic of an example electronic message-enabled device 91 having therein a message reply function 92 coupled to a processor 93.

In operation, the electronic message-enabled device 91 is adapted to send and receive electronic messages by any appropriate means. The message reply function 92 is adapted to automatically determine if message text of an original electronic message should be included in a reply electronic message. More generally, other components of an original electronic message can be included in a reply electronic message in addition to message text. For example, a message header of an original electronic message can be included in a reply electronic message. In some embodiments, some of these other components of an original electronic message are included in a reply electronic message notwithstanding including message text of the original electronic message. The message reply function 92 automatically determines if at least message text of an original electronic message should be included in a reply electronic message.

Preferably, the message reply function 92 is software implemented and is executed by the processor 93. However, more generally, the message reply function 92 may be implemented as software, hardware, firmware, or as any appropriate combination of software, hardware and firmware.

In some embodiments, the electronic messages are email messages. In other embodiments, other forms of electronic communication such as SMS (short message service), EMS (Enhanced Messaging Service), and MMS (Multimedia Message Service) may be used.

FIG. 10 shows a schematic of a particular electronic message-enabled device, namely an email-enabled wireless device 101. The email-enabled wireless device 101 has a message reply function 104 coupled to a processor 103. Also coupled to the processor is a wireless access radio 102. Other components that may be present in the email-enabled wireless device 101, such as the email program that uses the message reply function, are not shown so as to simplify the drawing.

In operation, the email-enabled wireless device 101 is adapted to communicate wirelessly over a wireless communication network, for example a cellular network (not shown), using the wireless access radio 102. The email-enabled wireless device 101 has at least the ability to send and receive email messages. The message reply function 104 is adapted to automatically determine if message text of an original email message should be included in a reply electronic message. More generally, other components of an original email message can be included in a reply email message in addition to message text. For example, a message header of an original email message can be included in a reply email message. In some embodiments, some of these other components of an original email message are included in a reply email message notwithstanding including message text of the original email message. The message reply function 102 automatically determines if at least message text of an original email message should be included in a reply email message.

Preferably, the message reply function 104 is software implemented as part of the email program and is executed by the processor 103. However, more generally, the message reply function 104 may be implemented as software, hardware, firmware, or as any appropriate combination of software, hardware and firmware.

Electronic Message-Enabled Systems

Figure 12:
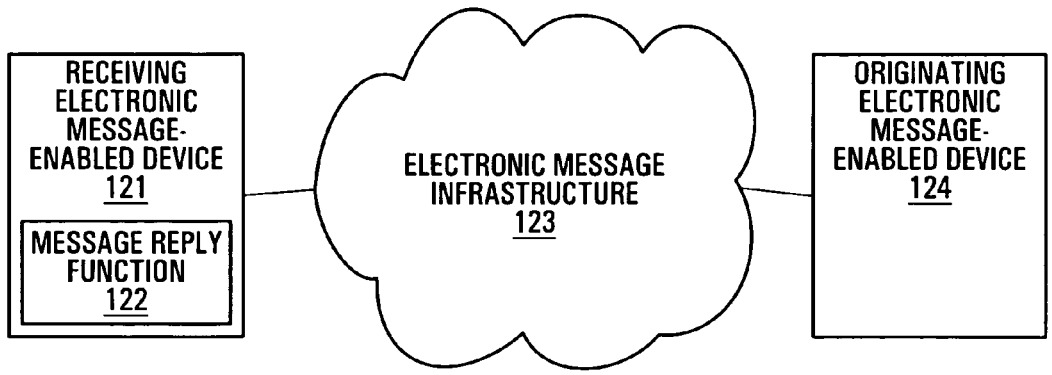
FIGS. 12 through 14 are schematics of example electronic message-enabled systems.
Figure 13:
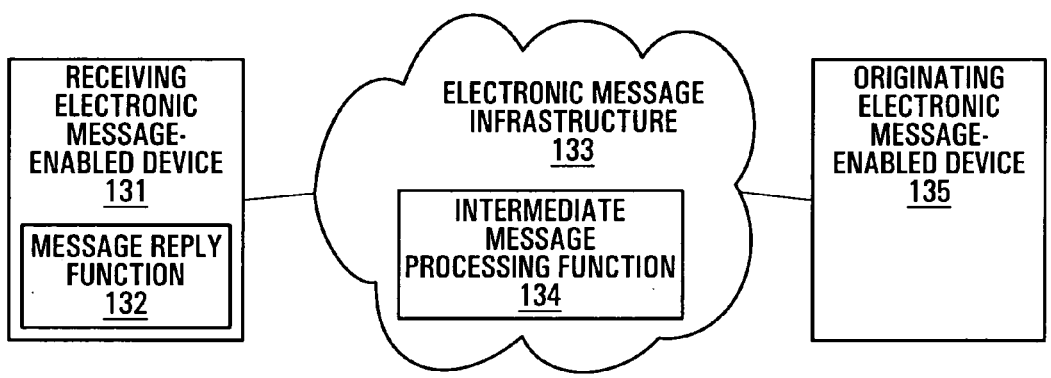
Figure 14:
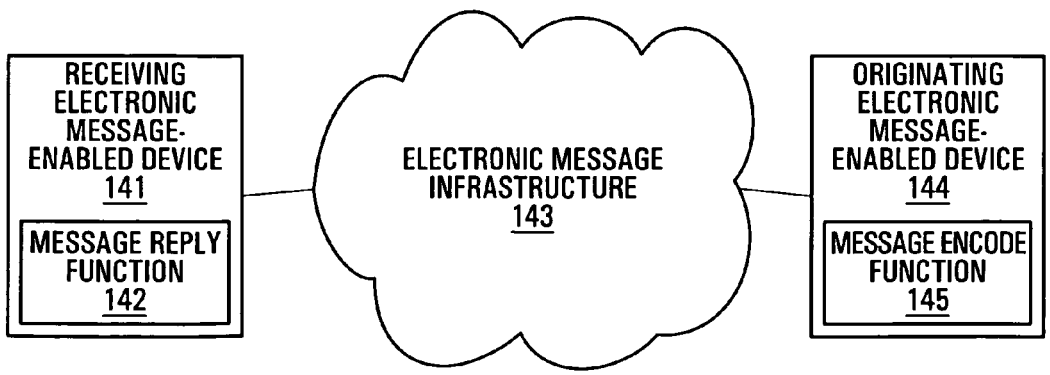

Referring now to FIGS. 12 through 14, shown are schematics of example electronic message-enabled systems. It is to be understood that an arbitrary arrangement of components is contemplated in these Figures and that numerous other arrangements are possible. It is also to be understood that some components and details are omitted for simplicity.

Shown in FIG. 12 is a schematic of an example electronic message-enabled system having an electronic message infrastructure 123 coupled to an originating electronic message-enabled device 124 and a receiving electronic message-enabled device 121. Inside the receiving electronic message-enabled device 121 is a message reply function 122.

In operation, the receiving electronic message-enabled device 121 and the originating electronic message-enabled device 121 can send and receive electronic messages to one another through the electronic message infrastructure 123. The electronic message infrastructure 123 routes electronic messages. The message reply function 122 automatically determines if message text of an original electronic message should be included in a reply electronic message.

Shown in FIGS. 13 and 14 are schematics of example electronic message-enabled systems adapted to encode into an original electronic message an indicative encoding as to whether or not a reply electronic message should include message text of the original electronic message. Original electronic message processing and encoding is discussed with reference to these electronic message-enabled systems. An original electronic message is sent from an originating electronic message-enabled device, routed through an electronic message infrastructure, and received by a receiving electronic message-enabled device. It is to be understood that references to original electronic messages are made notwithstanding any electronic message processing or encoding that might be performed along the way. From the perspective of an electronic message infrastructure, the original electronic message is an electronic message received from an originating electronic message-enabled device notwithstanding electronic message encoding performed by the originating electronic message-enabled device. From the perspective of a receiving electronic message-enabled device, the original electronic message is an electronic message received from an electronic message infrastructure notwithstanding electronic message processing and encoding performed by any of the electronic message infrastructure and originating electronic message-enabled device.

Encoding in Electronic Message Infrastructure

FIG. 13 shows a schematic of another example electronic message-enabled system having an electronic message infrastructure 133 coupled to an originating electronic message-enabled device 135 and a receiving electronic message-enabled device 131. Inside the receiving electronic message-enabled device 121 is a message reply function 132.

In operation, the receiving electronic message-enabled device 131 and the originating electronic message-enabled device 135 can send and receive electronic messages to one another through the electronic message infrastructure 133. The electronic message infrastructure 133 routes electronic messages. The message reply function 132 automatically determines if message text of an original electronic message should be included in a reply electronic message. The intermediate processing function 134 is adapted to perform message processing and encode into an original electronic message an indicative encoding as to whether or not a reply electronic message should include message text of the original electronic message.

There are many possible ways in which the intermediate processing function 134 can be implemented. In one example, message processing and encoding is performed by a server (not shown) adapted to route and handle email messages within the electronic message infrastructure 133. In another example, message processing and encoding is performed at a webmail infrastructure (not shown) within the electronic message infrastructure 133. Specific details of message processing and encoding are described later.

Encoding in Originating Electronic Message-Enabled Device

FIG. 14 shows a schematic of an example electronic message-enabled system having an electronic message infrastructure 143 coupled to an originating electronic message-enabled device 144 and a receiving electronic message-enabled device 141. Inside the receiving electronic message-enabled device 141 is a message reply function 142. Inside the originating electronic message-enabled device 144 is a message encode function 145.

In operation, the receiving electronic message-enabled device 141 and the originating electronic message-enabled device 144 can send and receive electronic messages to one another through the electronic message infrastructure 143. The electronic message infrastructure 143 is adapted to route electronic messages. The message reply function 142 automatically determines if message text of an original electronic message should be included in a reply electronic message. The message encode function 145 is adapted to encode into an original electronic message an indicative encoding as to whether or not a reply electronic message should include message text of the original electronic message.

There are many possible ways in which the message encode function 145 can be implemented. Specific details of message encoding are provided later.

Automatic Determination Methods

Referring now to FIGS. 1 through 8, shown are flowcharts of example methods of automatically determining if message text of an original electronic message should be included in a reply electronic message. One or more of these methods may be implemented in an electronic message-enabled device, for example, by the message reply function 92 of the electronic message-enabled device 91 shown in FIG. 9 or by the message reply function 104 of the email-enabled wireless device 101 shown in FIG. 10. The present application preferably uses email messages; however, as previously discussed, other forms of electronic messages are possible.

Shown in FIG. 1 is a flowchart of a method of automatically determining if message text of an original electronic message should be included in a reply electronic message. When a recipient receives an original electronic message containing message text from a sender, an electronic message address of the sender is typically made available to the recipient. If the user replies to an electronic message step 1-1, then at step 1-2 the electronic message-enabled device automatically determines if message text of the original electronic message should be included in the reply electronic message based on the original electronic message. Once the electronic message-enabled device automatically determines if message text of the original electronic message is to be included in the reply electronic message, then the reply electronic message is sent at step 1-3.

There are many ways in which the electronic message-enabled device can automatically determine if the message text of the original electronic message should be included in the reply electronic message based on the original electronic message. Many examples are provided with reference to FIGS. 2 through 7.

Automatic Determination Based on Domain Name

Figure 2:
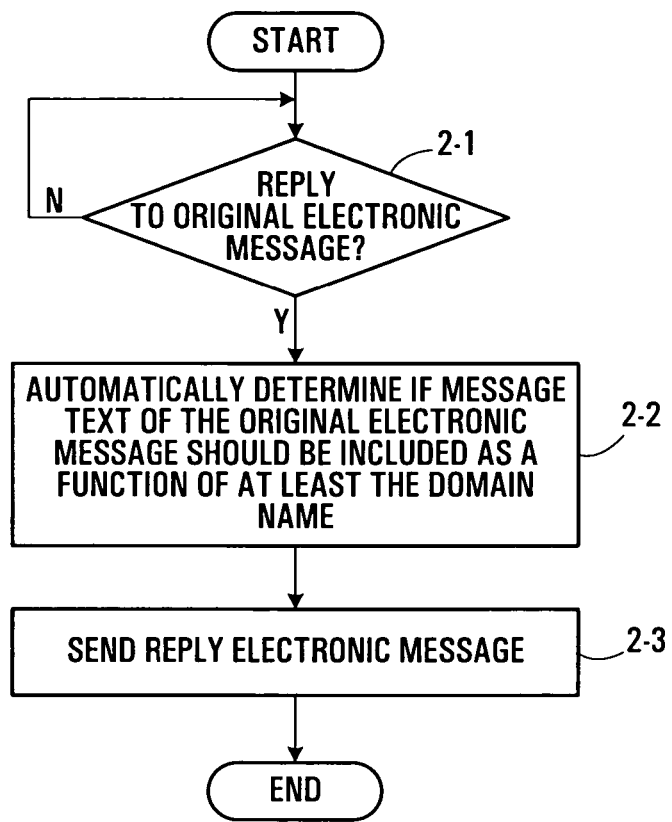

Shown in FIG. 2 is a flowchart of an example method of automatically determining if message text of an original electronic message should be included in a reply electronic message. When a recipient receives an electronic message from a sender, an electronic message address including a domain name of the sender is typically made available to the recipient. If a user replies to the electronic message at step 2-1, then at step 2-2 the electronic message-enabled device automatically determines if message text of the original electronic message should be included in the reply electronic message as a function of at least the domain name of the sender. Once the electronic message-enabled device automatically determines if message text of the original electronic message should be included in the reply electronic message, then the reply electronic message is sent at step 2-3.

Preferably, the domain name of the sender is checked in order to determine if users of the domain are charged extra for receiving larger electronic messages. If they are charged extra, then at step 2-2 the electronic message-enabled device preferably does not include message text of the original electronic message in the reply electronic message. However, if they are not charged extra, then the electronic message-enabled device preferably includes message text of the original electronic message in the reply electronic message.

There are many ways to implement a domain name check in order to determine if users of a domain are charged extra for larger electronic messages. In some embodiments, a domain name is checked against an identification of domains of service providers that charge extra for larger electronic messages. In some embodiments, the identification of domains of service providers that charge extra for larger electronic messages is manually generated. In some embodiments, a list containing the domain names is maintained. In other embodiments, a software-compiled identification of the domain names is implemented.

There are many components that can be used to implement the domain name check. In some embodiments, the domain name check is implemented by an electronic message infrastructure, for example by the intermediate processing function 134 of the electronic message infrastructure 133 shown in FIG. 13. In other embodiments, a domain name check is implemented locally at the electronic message-enabled device. In yet a further embodiment, multiple of these implementations are provided. The identification of domain names may be contained within the component performing the domain name check or the component could look for the identification of domain names elsewhere.

In some embodiments in which non-local domain name checks are performed, the electronic message-enabled device locally maintains an identification of domains that have been checked and determined to charge extra for larger electronic messages. In this case, the electronic message-enabled device may be able to use its locally maintained identification for determining if message text of original electronic messages should be included in subsequent reply electronic messages to domains previously checked. In another embodiment, the electronic message-enabled device does not locally maintain an identification of domains that charge extra for larger electronic messages and instead performs a domain name check before each reply electronic message is sent.

Automatic Determination Based on Address

Figure 3A:
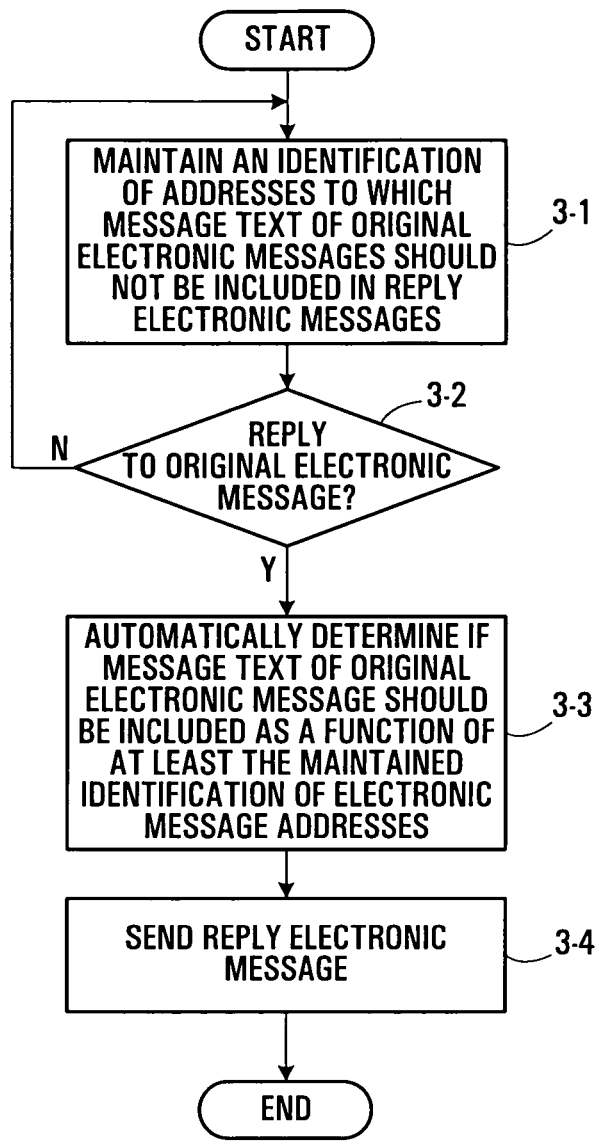

Shown in FIG. 3A is a flowchart of another example method of automatically determining if message text of an original electronic message should be included in a reply electronic message. On an ongoing basis at step 3-1 the electronic message-enabled device maintains an identification of electronic message addresses to which message text of original electronic messages should not be included in reply electronic messages. If a user replies to an electronic message at step 3-2, then at step 3-3 the electronic message-enabled device automatically determines if message text of the original electronic message should be included in the reply electronic message as a function of at least the maintained identification of electronic message addresses. Once the electronic message-enabled device automatically determines if message text of the original electronic message should be included in the reply electronic message, then the reply electronic message is sent at step 3-4.

In some embodiments, the electronic message-enabled device maintains an identification of electronic message addresses to which message text of original electronic messages should not be included in reply electronic messages based on user input. Electronic message addresses are maintained in a data structure for example an address book. Preferably, the user is able to specify their preference for including message text of original electronic messages in reply electronic messages for each entry in the data structure. There are many ways in which this can be implemented. In one example, each entry in the data structure includes an electronic message address and a preference field for encoding if reply electronic messages to the electronic message address should include message text of original electronic messages. Preferably, a default preference is encoded for an electronic message address when a user has not specified a preference for the electronic message address. In some embodiments, the default preference is to include message text of original electronic messages in reply electronic messages. In other embodiments, the default preference is to not include message text of original electronic messages in reply electronic messages.

Figure 3B:
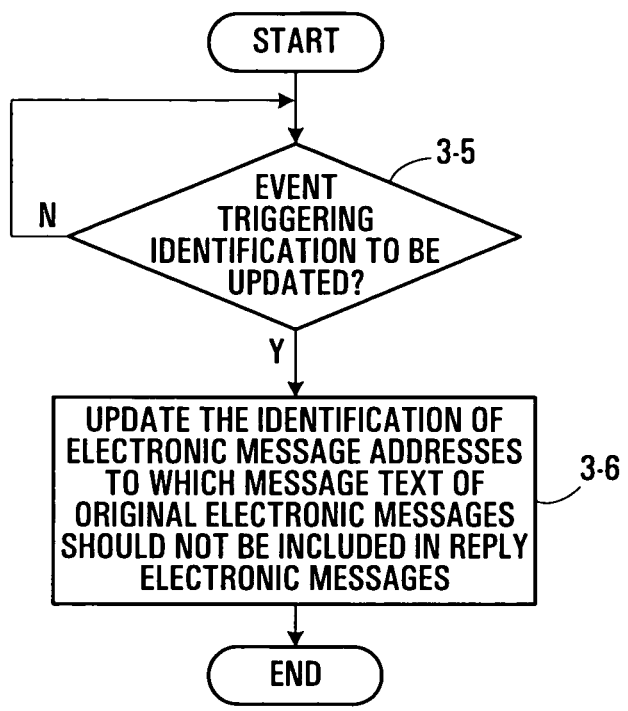

There are many ways in which a receiving user can specify their preference for including message text of original electronic messages in reply electronic messages to individual electronic message address. In some embodiments, the receiving user can add an entry, edit an existing entry, and delete an existing entry in the identification of electronic message addresses to which message text of original electronic messages should not be included in reply electronic messages to be updated. More generally, the identification of electronic message addresses to which message text of original electronic messages should not be included in reply electronic messages is updated upon an event triggering an update. As shown in FIG. 3B, if the electronic message-enabled device detects an event triggering the identification of electronic message addresses to which message text of original electronic messages should not be included in reply electronic messages to be updated at step 3-5, then the electronic message-enabled device updates the identification of electronic message addresses to which message text of original electronic messages should not be included in reply electronic messages at step 3-6.

Figure 3C:
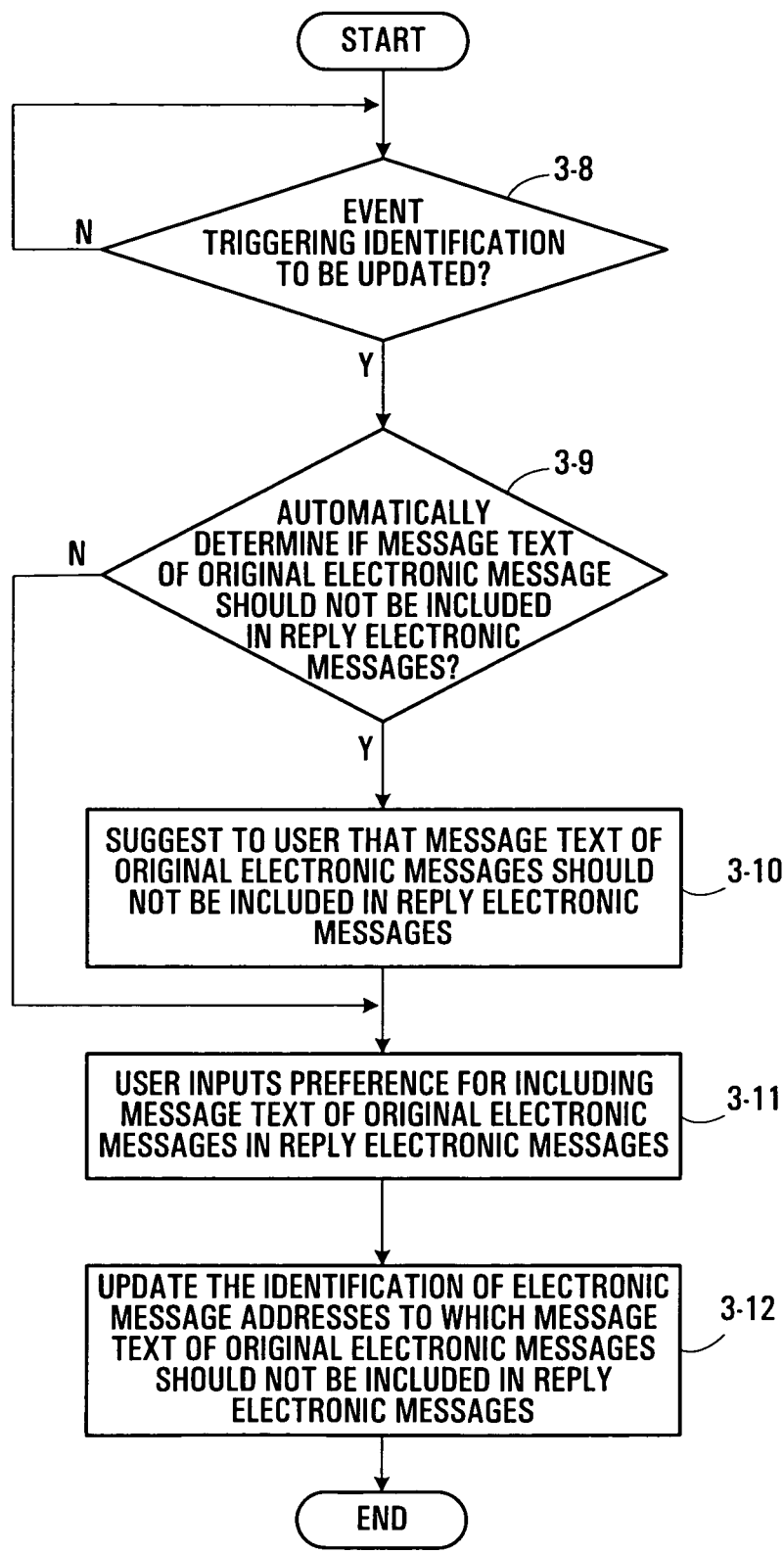

Shown in FIG. 3C is a flowchart of yet another example method of updating maintained information used for automatically determining if message text of original electronic messages should be included in reply electronic messages. Steps 3-8, and 3-12 are substantially identical to steps 3-5, and 3-6, respectively; therefore, their descriptions will not be repeated. If the electronic message-enabled device automatically determines that message text of original electronic messages should not be included in reply electronic messages at step 3-9, then at step 3-10 the electronic message-enabled device suggests to the user that message text of original electronic messages should not be included in reply electronic messages. Next at step 3-11 the user inputs their preference for including message text of original electronic messages in reply electronic messages. Once the user has input their preference, then at step 3-12 the identification of whether or not message text of original electronic messages should be included in reply electronic messages is updated.

There are many ways in which the electronic message-enabled device can determine that message text of original electronic messages should not be included in reply electronic messages. Many examples have been provided. Preferably, the electronic message-enabled device determines based on the domain name of the original electronic message if users of the domain are charged extra for larger electronic messages.

There are many ways in which the electronic message-enabled device can suggest to the user that message text of original electronic messages should not be included in reply electronic messages. For example, a pop-up dialog box containing a message could be implemented. In another example, step 3-10 is not implemented and instead the electronic message-enabled device asks the user if they are sure with their choice once the user has input their preference and their preference indicates to include message text of original electronic message in reply electronic messages even though smaller messages are preferred. In other implementations, step 3-11 is skipped and a default setting of including the message text is used. Numerous implementation-specific possibilities can be provided.

Automatic Determination Based on Indicative Encoding

Figure 4:
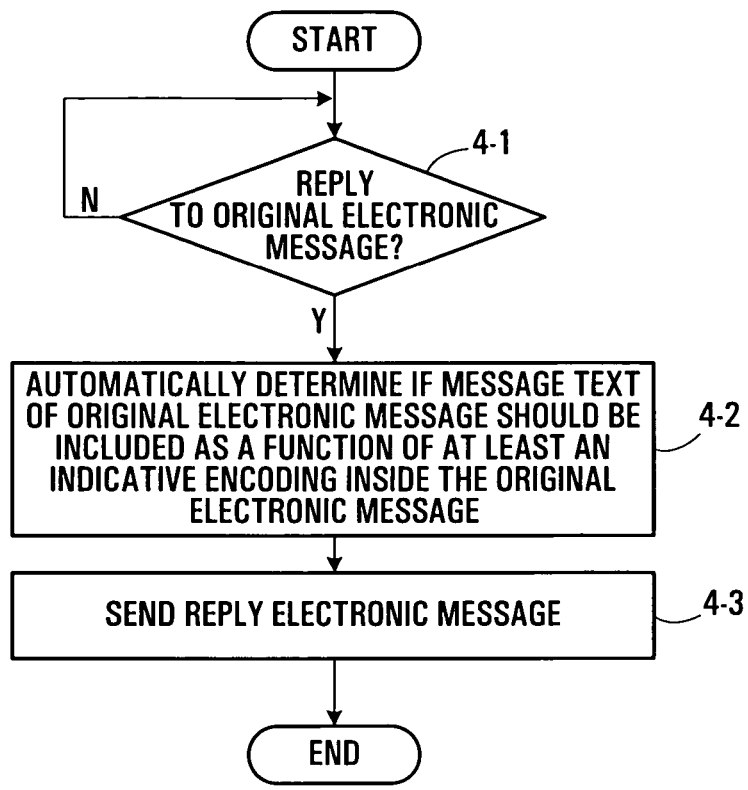

Shown in FIG. 4 is a flowchart of another example method of automatically determining if message text of an original electronic message should be included in a reply electronic message. In some embodiments, electronic messages are supplied with an indicative encoding as to whether or not reply electronic messages should include message text of the original electronic message. If a user replies to such an electronic message at step 4-1, then at step 4-2 the electronic message-enabled device automatically determines if message text of the original electronic message should be included in the reply electronic message as a function of at least the indicative encoding of the original electronic message. Once the electronic message-enabled device automatically determines if message text of the original electronic message should be included in the reply electronic message, then the reply electronic message is sent at step 4-3.

Figure 11:
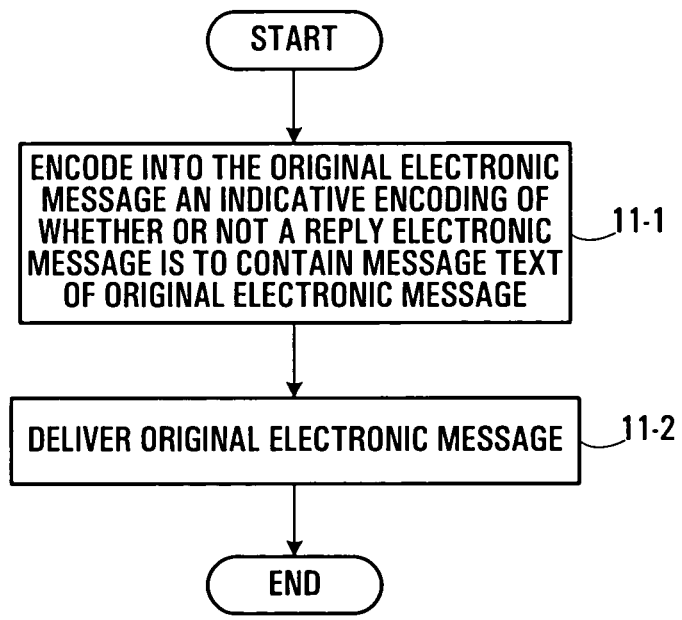
FIG. 11 is a flowchart of an example method of encoding an original electronic message so that an electronic message-enabled device can automatically determine if message text of the original electronic message should be included in a reply electronic message.

There are many ways in which electronic messages can be encoded to indicate whether or not reply electronic messages should include message text of the original electronic message. Electronic messages typically contain a header. Preferably, the header is used to encode information used for determining whether or not a reply electronic message should include message text of the original electronic message. Referring to FIG. 11, shown is a flowchart of an example method of encoding an original electronic message so that an electronic message-enabled device can automatically determine if message text of the original electronic message should be included in a reply electronic message. This method may be implemented in an electronic message infrastructure, for example by the intermediate message processing function 134 of the electronic message infrastructure 133 shown in FIG. 13. This method may also be implemented in an originating device for example by the message encode function 145 of the originating electronic message-enabled device 144 shown in FIG. 14.

At step 11-1 the original electronic message is encoded with an indicative encoding of whether or not a reply electronic message is to contain message text of the original electronic message. Once the original electronic message has been encoded with the indicative encoding, then the original electronic message is delivered at step 11-2.

There are many components that can encode the information used for determining whether or not a reply electronic message should include message text of the original electronic message. In one example, the originating device is adapted to encode a preference into the electronic message. This could be implemented in an originating device for example by the message encode function 145 of the originating electronic message-enabled device 144 in FIG. 14. In this case, a user of the originating electronic message-enabled device 144 has some control as to whether or not they want to receive replies containing message text of their original electronic messages. In a second example, an electronic message infrastructure is adapted to encode the information. This functionality can be implemented for example by the intermediate message processing function 134 of the electronic message infrastructure 133 shown in FIG. 13. In some embodiments, the electronic message infrastructure 133 performs a domain name check on an electronic message and encodes results of the domain name check into the electronic message. In a third example, multiple of these implementations are provided. In this case, information from a plurality of components is encoded into an electronic message. For example, a preference of the originator and an indication from the electronic message infrastructure 133 if the originator is charged extra for larger electronic messages may both be encoded into an electronic message.

There are many possible implementations for automatically determining if message text of the original electronic message should be included in the reply electronic message as a function of the indicative encoding of the original electronic message. In some embodiments, if the originator has indicated a preference, then the preference of the originator is followed notwithstanding information encoded by a server. In other embodiments, if a server has provided data indicative of whether or not a reply electronic message should include message text of the original electronic message, then the data from the server is followed. In yet other embodiments, if the originator has encoded a preference that contrasts with data encoded from a server, then the encoded information and originator preference is presented to the user so that the user may manually determine whether or not the reply electronic message should include message text of the original electronic message.

Automatic Determination Based on Alias Detection

Figure 5:
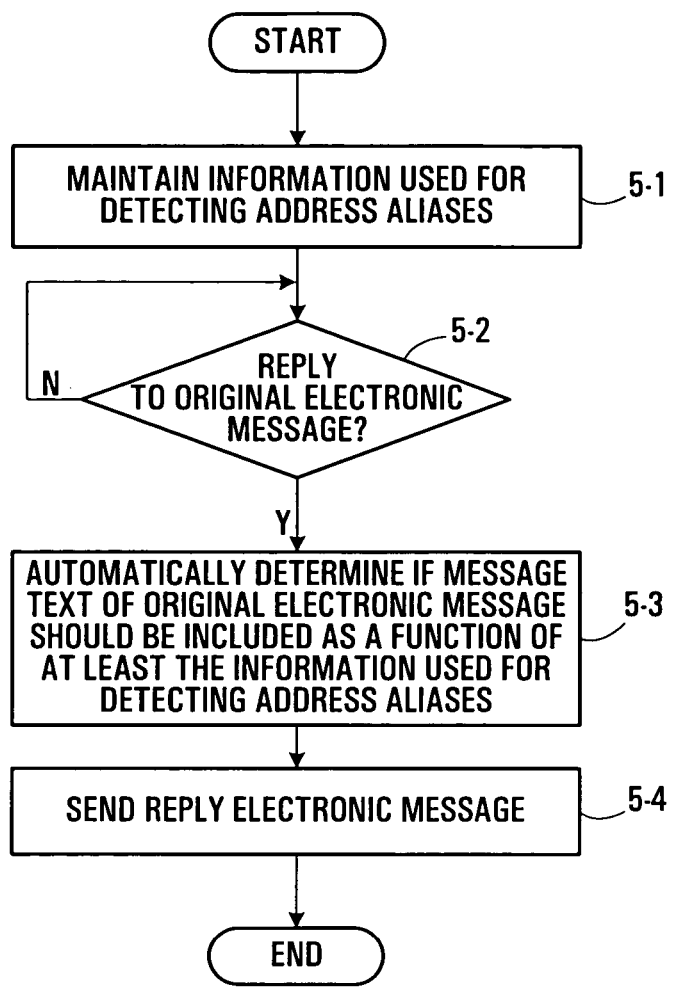

Shown in FIG. 5 is a flowchart of another example method of automatically determining if message text of an original electronic message should be included in a reply electronic message. Some electronic message users establish address aliases. Electronic messages are automatically routed to an electronic message address when sent to its address alias. At step 5-1, information used for detecting address aliases is maintained. If a user replies to an electronic message at step 5-2, then at step 5-3 the electronic message-enabled device automatically determines if message text of the original electronic message should be included in the reply electronic message as a function of at least the information used for detecting address aliases. Once the electronic message-enabled device automatically determines if message text of the original electronic message should be included in the reply electronic message, then the reply electronic message is sent at step 5-4.

There are many ways in which the electronic message-enabled device can detect address aliases. In one example, the mail-enabled device maintains information of messages sent in order to detect address aliases. If the electronic message-enabled device receives a second message, then based on the maintained information, the electronic message-enabled device can determine whether or not the second message is in reply to a first message previously sent by the electronic message-enabled device. There are many ways in which the electronic message-enabled device can determine whether or not the second message is in reply to a first message. For example, if the subject of the second message contains "re:" followed by particular subject text, then the electronic message-enabled device can search through its maintained information for a sent massage having the same particular subject text as its subject (i.e. a first message). If such a sent message is found, then the electronic message-enabled device has determined that the second message is in reply to a first message. If the second message is in reply to a first message, then the electronic message-enabled device determines if the second message has come from an electronic message address differing from the electronic message address that the first message was sent to. If the two electronic message address are different, then the electronic message-enabled device has detected use of an address alias.

If use of address aliases is detected by the electronic message-enabled device, then the electronic message enabled-system determines at step 5-3 if message text of the original electronic message (i.e. the second message) should be included in the reply electronic message. There are many implementation specific ways in which this can be accomplished. In some embodiments, each of the two electronic message addresses are considered in any appropriate manner as previously discussed. For example, a domain name check can be performed on each of the two electronic message addresses. In some embodiments, if a domain name check indicates that users of any one of the two domains are charged extra for larger electronic messages, then message text of the original electronic message is not included at step 5-3. It is to be understood that there are numerous possible implementations of step 5-3 for the electronic message-enabled device.

Specific embodiments have been described whereby the electronic message-enabled device includes message text of the original electronic message as a function of at least locally maintained information used for detecting address alias detection. More generally, address alias detection may be implemented locally, within an electronic message infrastructure, or locally and within the electronic message infrastructure. Address alias detection may be implemented for example by the intermediate processing function 134 of the electronic message infrastructure 133-shown in FIG. 13 in a similar manner as described for the electronic message-enabled device. In some embodiments, if the electronic message infrastructure 133 detects use of address aliases, the electronic message infrastructure 133 encodes information regarding the address alias into the original electronic message (i.e. the second message) before routing it to the electronic message-enabled device. In some embodiments, the information encoded by the electronic message infrastructure 133 includes an identification of each of the two electronic message addresses. In other embodiments, the electronic message infrastructure 133 analyses each of the two electronic message addresses, for example by performing a domain name check as previously described, and encodes an indication of whether or not message text of the original electronic message (i.e. the second message) should be included in the reply electronic message.

Automatic Determination Based on Original Electronic Message & User Input

Figure 6:
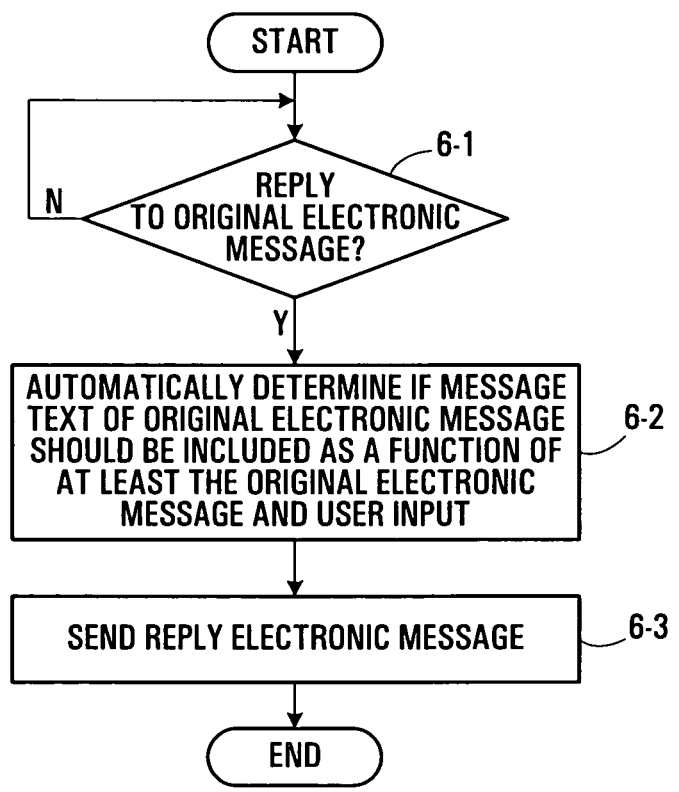

Shown in FIG. 6 is a flowchart of another example method of automatically determining if message text of an original electronic message should be included in a reply electronic message. If a user replies to the electronic message at step 6-1, then at step 6-2 the electronic message-enabled device automatically determines if message text of the original electronic message should be included in the reply electronic message as a function of at least the original electronic message and user input. Once the electronic message-enabled device automatically determines if message text of the original electronic message should be included in the reply electronic message, then the reply electronic message is sent at step 6-3.

Preferably, regardless of whether or not message text of an original electronic message is included in a reply electronic message, a user can see the original electronic message while they compose their reply electronic message. Preferably, the electronic message-enabled device indicates in an appropriate manner if message text of the original electronic message is to be included. There are many ways in which this can be accomplished. In some embodiments, if the original electronic message is automatically determined to be to be included in the reply electronic message, then the original electronic message can be preceded with text " - - - Original electronic message - - - " and with " . . . Original electronic message (Not Included) - - - " when message text of the original electronic message is not to be included in the reply electronic message. In another example, highlighting, distinctive markings, or different colours can be implemented in order to distinguish between message text of an original electronic message that is actually included in the reply electronic message and message text of an original electronic message that is not.

Preferably, a user can provide input as to whether or not message text of an original electronic message is to be included in a reply electronic message. In some embodiments, a user can manipulate the markings used to distinguish if an original electronic message is actually included in a reply electronic message in order to input their preference for including the original electronic message. For example, the electronic message-enabled device could be implemented so that a user can select between the text "- - - Original electronic message - - - " and " - - - Original electronic message (Not Included) - - - ". Based on the user selection, message text of the original electronic message will either be included or not included. In other embodiments, the user is prompted with a dialog box prior to sending the reply electronic message if the electronic message-enabled device has determined that the original electronic message should not be included in the reply electronic message, the dialog box providing the user with the option to include or not include message text of the original electronic message with not including message text of the original electronic message being a default choice.

If a user has input a choice to include or not include message text of an original electronic message in a reply electronic message and the choice is contrary to what the electronic message-enabled device would automatically determine, then the user has overridden the electronic message-enabled device. In some embodiments, when the electronic message-enabled device has been overridden, the user's choice is used to update the maintained information.

Automatic Determination & User Override

Figure 7A:
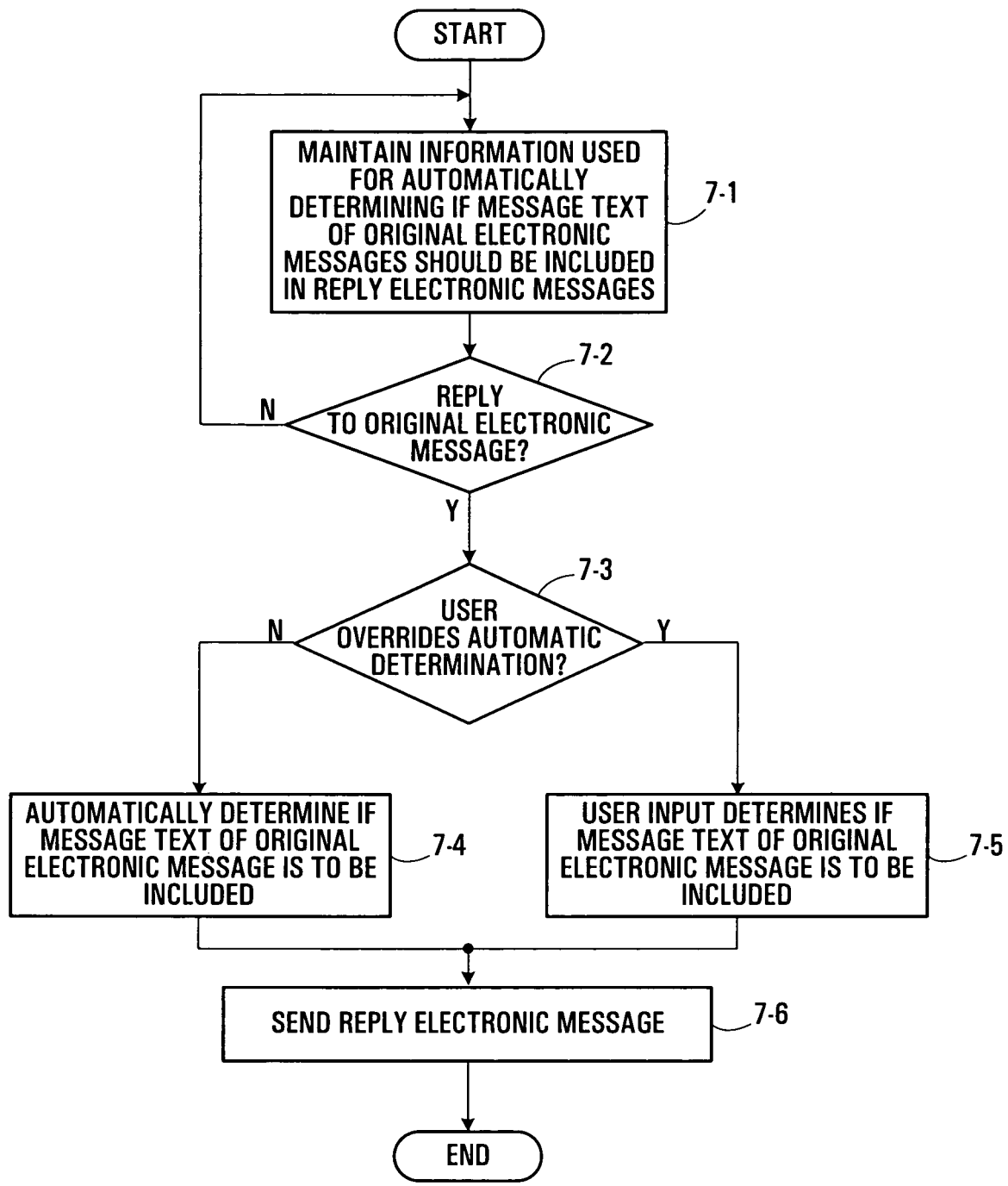

Shown in FIG. 7A is a flowchart of another example method of automatically determining if message text of an original electronic message should be included in a reply electronic message. On an ongoing basis at step 7-1 the electronic message-enabled device maintains information used for automatically determining if message text of original electronic messages should be included in reply electronic messages. If a user replies to an electronic message at step 7-2, then at step 7-3 the electronic message-enabled device determines if the user is overriding the automatic determination of including message text of the original electronic message in the reply electronic message. If the electronic message-enabled device determines that the user did not override the automatic determination, then at step 7-4 the electronic message-enabled device automatically determines if message text of the original electronic message should be included in the reply electronic message. However, if the electronic message-enabled device determines that the user did override the automatic determination, then at step 7-5 user input determines if message text of the original electronic message should be included in the reply electronic message. At step 7-6 the reply electronic message is sent.

There are many possibilities for maintaining information used for automatically determining if message text of original electronic messages should be included in reply electronic messages. In some embodiments, the electronic message-enabled device is implemented to maintain an identification of electronic message addresses to which message text of original electronic messages should not be included in reply electronic messages based on user input. In other embodiments, the electronic message-enabled device is implemented to maintain an identification of domain names to which shorter electronic messages are preferred. In further embodiments, multiple of these implementations are provided.

There are many possibilities for automatically determining if message text of the original electronic message should be included in the reply electronic message. Preferably, the electronic message-enabled device determines this based on at least the information maintained at step 7-1. However, some embodiments do not require the information maintained at step 7-1; therefore, in such embodiments, it may be preferred to implement the method of FIG. 7A without step 7-1. Many examples of how the electronic message-enabled device could automatically determine if message text of the original electronic message is to be included in the reply electronic message with or without any maintained information have been described already. Therefore, their descriptions will not be repeated.

Figure 7B:
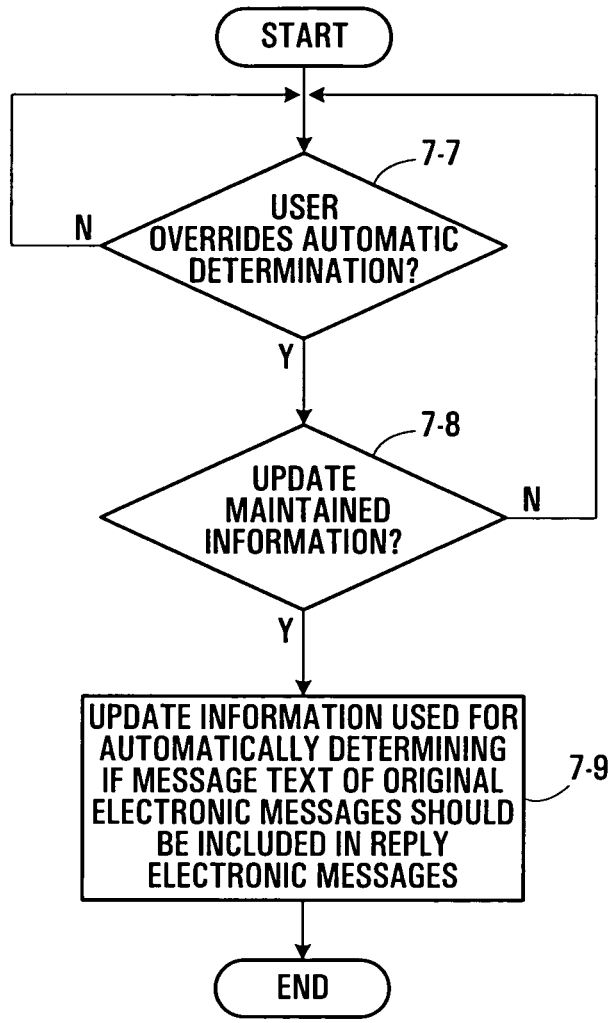

Shown in FIG. 7B is a flowchart of an example method of updating maintained information used for automatically determining if message text of original electronic messages should be included in reply electronic messages. If the user overrides the automatic determination at step 7-7 and the electronic message-enabled device determines that the maintained information should be updated, then at step 7-8, then the electronic message-enabled device utilises the user's input to update the maintained information at step 7-9.

There are many ways in which the electronic message-enabled device may determine if the maintained information should be updated when the user overrides the electronic message-enabled device. In some embodiments, the electronic message-enabled device always updates the maintained information when the user overrides the electronic message-enabled device. In other embodiments, the maintained information is updated only if the user overrides the electronic message-enabled device for the same electronic message address twice in a row. There are many ways in which this functionality could be implemented. In one example, a counter is implemented for each electronic message address in the data structure of the maintained information. Each time the electronic message-enabled device automatically determines if message text of an original electronic message is to be included in a reply electronic message and the user does not override the decision, then the counter associated with the electronic message address being replied to is reset. However, if the user does override, then the counter is incremented. The counter is compared against a predetermined value, for example, 2. If the counter reaches the predetermined value, then the maintained information is updated and the counter is reset. Preferably, the user can determine the predetermined value. In further embodiments, a multiple of implementations are possible and the user can choose between them.

Automatic Determination Based on Combination of Methods

Many specific example methods of automatically determining if message text of an original electronic message should be included in a reply electronic message have been described with reference to FIGS. 2 through 7. It is to be understood that a plurality of these methods may be implemented simultaneously. It is also to be understood that a plurality of these methods may be integrated together and may result in integration and implementation specific steps.

Figure 8:
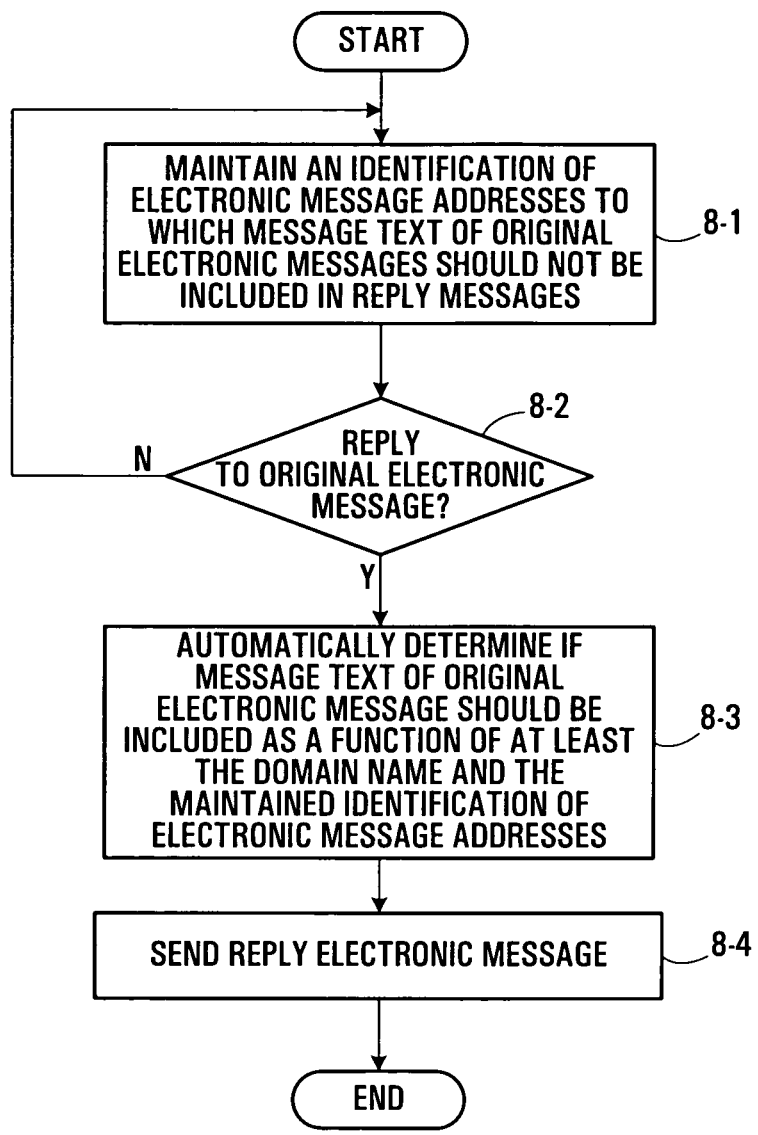

Shown in FIG. 8 is a flowchart of an example method that integrates a plurality of methods previously described in order to automatically determine if message text of an original electronic message should be included in a reply electronic message. In particular, the method shown in FIG. 8 is an integration of the methods shown in FIGS. 2 and 3. Method steps 8-1, 8-2, and 8-4 are substantially identical to method steps 3-1, 3-2, and 3-4, respectively; therefore, their description will not be repeated. At step 8-3 the electronic message-enabled device automatically determines if message text of the original electronic message should be included in the reply electronic message as a function of at least the maintained identification of electronic message addresses and the domain name of the sender of the original electronic message.

Since the method shown in FIG. 8 is an integration of the methods shown in FIGS. 2 and 3, previously discussed embodiments for the methods of FIGS. 2 and 3 also apply to the method of FIG. 8, but are not repeated for sake of simplicity.

There are many situations in which it may be advantageous to combine the methods of FIGS. 2 and 3. For example, if a user has not specified a preference for including message text of original electronic messages in reply electronic messages for a particular electronic message address, then the electronic message-enabled device may automatically determine this based on the domain name of the particular electronic message address. However, if a user has specified a preference for including message text of original electronic messages in reply electronic messages for a particular electronic message address, then the electronic message-enabled device may automatically determine if message text of original electronic messages should be included in reply electronic messages based on the user's specified preference without checking the domain name of the particular electronic message address.

Electronic Message Addresses

Numerous examples have made reference to electronic message addresses of originators. Preferably, the electronic message-enabled device determines electronic message addresses of originators based on electronic message headers. In some embodiments, electronic message headers include more than one electronic message addresses. For example, some electronic message headers include a "from" electronic message address and a "reply to" electronic message address. An example electronic message that can contain these two electronic message addresses is an email message. In some embodiments, the "from" electronic message address is an electronic message address specified by the originator to be their electronic message address. In some embodiments, the "reply-to" electronic message address is an electronic message address specified by the originator so as provide an electronic message address for reply electronic messages.

The "from" electronic message address and the "reply-to" electronic message address may or may not be identical. In some embodiments, when the two electronic message addresses are not identical, the electronic message-enabled device disregards the "reply to" electronic message address and instead considers the "from" electronic message address to be the electronic message address of the originator. In other embodiments, the electronic message-enabled device disregards the "from" electronic message address and instead considers the "reply to" electronic message address to be the electronic message address of the originator. In yet other embodiments, the electronic message-enabled device gives consideration to both electronic message addresses.

There are many possible variations of the above teachings in light of electronic message headers containing more than one electronic message addresses. In a first example, domain name checks are never performed on domain names of "from" electronic message addresses and are only performed on "reply-to" electronic message addresses. In a second example, if any one of the two electronic message addressees have been identified as being an electronic message address to which message text of original message text should not be included in reply electronic messages, then message text of the original electronic message is not included in a reply electronic message. In a third example, only the "from" electronic message address is considered when detecting electronic message address aliases. It is to be understood that if the electronic message-enabled device gives consideration to both electronic message addresses, then many implementation variations are possible for many of the previously described methods.

Numerous modifications and variations of the present application are possible in light of the above teachings. It is therefore to be understood that within the scope of the appended claims, the application may be practised otherwise than as specifically described herein.

I claim:

1. A method for execution in an electronic message-enabled device, the method comprising:
receiving an original electronic message sent from a sender, the original electronic message comprising original message text;
automatically determining if a reply electronic message is to contain at least the original message text based on whether the sender is charged a fee according to size of electronic messages received;
if the sender is charged a fee according to size of electronic messages received, omitting the original message text from the reply electronic message;
if the sender is not charged a fee according to size of electronic messages received, including the original message text in the reply electronic message; and
sending the reply electronic message.

2. The method of claim 1 wherein:
the original electronic message comprises an originating address of the sender, the originating address comprising a domain name; and
automatically determining if the reply electronic message is to contain at least the original message text is based on at least the domain name.

3. The method of claim 2 further comprising:
performing a domain name check to determine if users of the domain name are charged according to size of electronic messages received.

4. The method of claim 3 wherein performing the domain name check comprises performing a comparison of the domain name with an identification of domains of service providers that charge users according to size of electronic messages received.

5. The method of claim 1 further comprising:
maintaining information useful for automatically determining if the reply electronic message is to contain at least the original message text;
wherein automatically determining if the reply electronic message is to contain at least the original message text is further based on the maintained information.

6. The method of claim 2 wherein:
the original electronic message further comprises an indicative encoding of whether users of the domain name are charged according to size of electronic messages received; and
automatically determining if the reply electronic message is to contain the original message text is based on at least the indicative encoding.

7. The method of claim 1 further comprising:
accepting user input;

wherein automatically determining if the reply electronic message is to contain the original message text is further based on the user input.

8. The method of claim 7 further comprising:
maintaining information useful for automatically determining if the reply electronic message is to contain at least the original message text; and
upon a user override, updating the maintained information according to the user override.

9. An electronic message-enabled device comprising:
a processor; and
a message reply function configured to implement a method comprising:
receiving an original electronic message sent from a sender, the original electronic message comprising original message text;
automatically determining if a reply electronic message is to contain at least the original message text based on whether the sender is charged a fee according to size of electronic messages received;
if the sender is charged a fee according to size of electronic messages received, omitting the original message text from the reply electronic message;
if the sender is not charged a fee according to size of electronic messages received, including the original message text in the reply electronic message; and
sending the reply electronic message.

10. The electronic message-enabled device of claim 9, wherein the electronic message-enabled device is an email-enabled wireless device comprising a wireless access radio.

11. A non-transitory computer readable medium having computer executable instructions stored thereon for execution on a processor of an electronic message-enabled device or an email-enabled wireless device so as to implement a method comprising:
receiving an original electronic message sent from a sender, the original electronic message comprising original message text;
automatically determining if a reply electronic message is to contain at least the original message text based on whether the sender is charged a fee according to size of electronic messages received;
if the sender is charged a fee according to size of electronic messages received, omitting the original message text from the reply electronic message; and
if the sender is not charged a fee according to size of electronic messages received, including the original message text in the reply electronic message; and
sending the reply electronic message.

12. A method for execution in an electronic message infrastructure, the method comprising:
receiving an original electronic message sent from a sender, the original electronic message comprising original message text;
determining whether the sender is charged a fee according to size of electronic messages received;
encoding into the original electronic message an indicative encoding of whether the sender is charged a fee according to size of electronic messages received; and
sending the original electronic message;
wherein the encoding into the original electronic message is executed by the electronic message infrastructure, which is separate from the sender.

13. The method of claim 12, wherein the original electronic message further comprises an originating address of the sender, the originating address comprising a domain name, the method further comprising:

performing a domain name check to determine if users of the domain name are charged according to size of electronic messages received.

14. An electronic message infrastructure configured to implement a method comprising:
receiving an original electronic message sent from a sender, the original electronic message comprising original message text;
determining whether the sender is charged a fee according to size of electronic messages received;
encoding into the original electronic message an indicative encoding of whether the sender is charged a fee according to size of electronic messages received; and
sending the original electronic message;
wherein the encoding into the original electronic message is executed by the electronic message infrastructure, which is separate from the sender.

15. A non-transitory computer readable medium having computer executable instructions stored thereon for execution on an electronic message infrastructure so as to implement a method comprising:
receiving an original electronic message sent from a sender, the original electronic message comprising original message text;
determining whether the sender is charged a fee according to size of electronic messages received;
encoding into the original electronic message an indicative encoding of whether the sender is charged a fee according to size of electronic messages received; and
sending the original electronic message;
wherein the encoding into the original electronic message is executed by the electronic message infrastructure, which is separate from the sender.

16. The method of claim 5 wherein the maintained information comprises an identification of message addresses to which original message text is not included in reply electronic messages.

17. The method of claim 16 wherein maintaining information comprises:
in response to user input, adding an identification of a message address to which original message text is not included in reply electronic messages; and
in response to user input, editing an existing identification of message address to which original message text is not included in reply electronic messages.

18. The method of claim 17 wherein:
the original electronic message further comprises a "reply-to" address and a "from" address; and
if anyone of the "reply-to" address and the "from" address is identified as being a message addresses to which original message text is not included in reply electronic messages, then the original message text is not included in the reply electronic message.

19. The method of claim 7 further comprising:
an override mechanism allowing a user to override the automatic determination of including at least the original message text in the reply electronic message.

20. The electronic message-enabled device of claim 9, wherein:
the original electronic message comprises an originating address of the sender, the originating address comprising a domain name; and
the message reply function is configured for automatically determining if the reply electronic message is to contain at least the original message text is based on at least the domain name.

* * * * *